United States Patent
Fergle et al.

[11] Patent Number: 5,829,565
[45] Date of Patent: Nov. 3, 1998

[54] ONE-WAY CLUTCH

[75] Inventors: Donald J. Fergle, Grand Blanc; Erlen B. Walton, Farmington Hills; James M. Brown, Allen Park, all of Mich.

[73] Assignee: Eaton Corporation, Cleveland, Ohio

[21] Appl. No.: 771,080

[22] Filed: Dec. 20, 1996

[51] Int. Cl.⁶ ............................. F16D 41/12; F16H 41/24
[52] U.S. Cl. ............................. 192/46; 60/345; 192/45.1; 192/69.1
[58] Field of Search ................... 192/46, 45.1, 69.1, 192/3.34, 66.22, 66.31, 89.2, 69.62, 69.61, 69.6; 60/345; 267/163, 161, 158

[56] References Cited

U.S. PATENT DOCUMENTS

| 224,524 | 2/1880 | Farnum . | |
|---|---|---|---|
| 547,386 | 10/1895 | Stewart | 192/46 |
| 1,615,534 | 1/1927 | Cassel | 192/46 |
| 2,690,240 | 11/1954 | Schroeder | 188/82.74 |
| 3,623,582 | 11/1971 | Solothurn | 192/46 |
| 4,441,315 | 4/1984 | Bochot | 60/345 |
| 4,635,502 | 1/1987 | George | 74/625 |
| 5,070,978 | 12/1991 | Pires | 192/45.1 |
| 5,125,487 | 6/1992 | Hodge | 192/3.34 |
| 5,505,590 | 4/1996 | Döhring | 416/180 |
| 5,597,057 | 1/1997 | Ruth et al. | 192/45.1 X |
| 5,678,668 | 10/1997 | Sink | 192/45.1 X |

*Primary Examiner*—Rodney H. Bonck
*Attorney, Agent, or Firm*—L. J. Kasper

[57] ABSTRACT

A one-way clutch assembly (15) including a planar drive member (57) and a planar driven member (25, 27) defining driven pockets (33), and a pawl (55) disposed in each driven pocket. A one-piece spring assembly (45) is disposed adjacent the driven plate (27) and includes a spring member (49) in biasing engagement with each of the pawls (55). In one embodiment, the drive member (57) is molded integrally with an annular stator hub (19) of a torque converter stator (13).

14 Claims, 4 Drawing Sheets

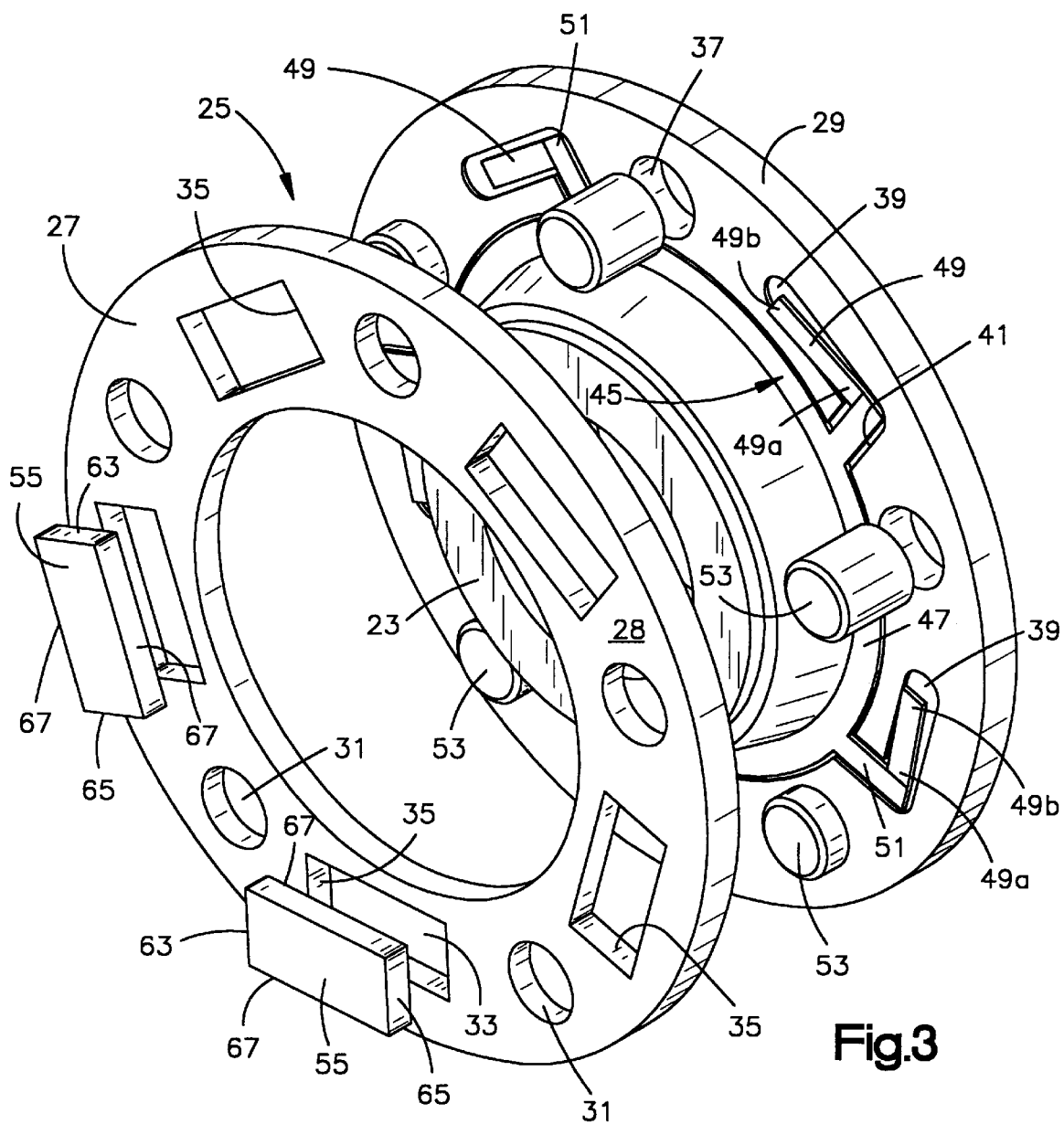
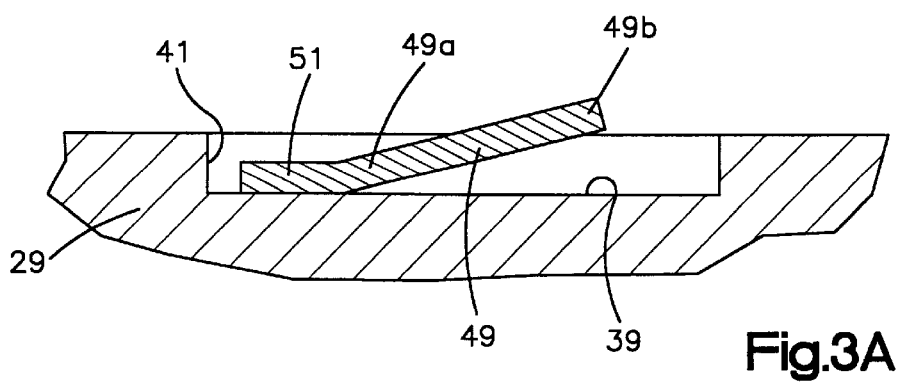
Fig.3
Fig.3A

ONE-WAY CLUTCH

BACKGROUND OF THE DISCLOSURE

The present invention relates to one-way clutches, and more particularly, to such clutches in which one of the members is able to overrun the other member.

More specifically, the present invention relates to such a one-way clutch (OWC) of the "planar" type, in which a drive torque or force is transmitted from one member to the other by means of a plurality of pawls (sometimes also referred to as "struts").

One-way clutches and overrunning clutches are of two general types, the first being of the "radial" type, in which the drive and driven members are generally cylindrical and concentric, and drive torque is transmitted when the pawls move radially to engage both the drive and driven members. The other type of OWC, and the type to which the present invention relates, is the "planar" type in which the drive and driven members include drive and driven surfaces, respectively, which are planar (i.e., perpendicular to the axis of rotation of the members). In a planar OWC, the pawls move axially to a position in which they are in engagement with both the drive and driven member, to transmit torque or force therebetween.

One-way clutches of the planar type have been known for many years, and examples thereof may be seen in U.S. Pat. Nos. 224,524; 547,386; 2,690,240; 3,623,582; 4,635,502; and 5,070,978, all of which are incorporated herein by reference.

In an OWC of the type shown in above-incorporated 547,386 and 5,070,978, each of the pawls comprises a separate member, and each of the springs included to bias the pawl toward its engaged position also comprises a separate member. The above-described arrangement is functionally generally satisfactory, but as those skilled in the art have increased the number of pawls in order to increase the "resolution" of the OWC, the total number of parts has increased substantially, thus adding to the time and difficulty of assembly, as well as the cost thereof.

BRIEF SUMMARY OF THE INVENTION

Accordingly, it is an object of the present invention to provide an improved one-way clutch assembly of the type having individual pawls, but wherein the total number of parts required is reduced from what is taught by the prior art.

The above and other objects of the invention are accomplished by the provision of a one-way clutch assembly of the type including a planar driven member mounted for rotation about an axis, the planar driven member including a planar drive face disposed normal to the axis. A planar drive member is mounted for rotation about the axis and has a drive direction of rotation, the planar drive member defining a plurality of drive pockets, each including a drive surface. The driven face defines a plurality of driven pockets, each including a driven surface. A plurality of pawls is disposed in one of the drive and driven pockets, each of the pawls comprising a separate member, and having a retracted position in which each pawl is disposed wholly within one of the drive and driven pockets. The pawls also have a drive position in which each pawl engages both the drive surface and the driven surface as the drive and driven members transmit torque in the drive direction of rotation. The assembly includes means operable to bias each of the pawls toward the drive position.

The one-way clutch assembly is characterized by the means operable to bias each of the pawls comprising a plurality of spring members, each being disposed axially adjacent one of the pawls. An annular support member is disposed in an annular recess defined by one of the drive and driven members, and each of the plurality of spring members is formed integrally with the annular support member.

In accordance with another aspect of the invention, the clutch assembly comprises part of a stator assembly adapted for use in a torque converter, the stator assembly being of the type comprising a stator hub and a plurality of stator blades, at least a part of the drive member being formed integrally with the stator hub and the plurality of stator blades, and the drive member defining the drive pockets. Preferably, the stator hub, the plurality of stator blades, and the drive member comprise a one-piece plastic molding.

BRIEF DESCRIPTION OF THE DRAWINGS

FIG. 3 is an exploded, perspective view of the drive assembly of the present invention, viewed from the left in FIG. 1, but on a somewhat larger scale than FIG. 1.

FIG. 3A is an enlarged, fragmentary cross-section taken through one of the spring members shown in perspective view in FIG. 3.

DETAILED DESCRIPTION OF THE PREFERRED EMBODIMENTS

Figure 1:
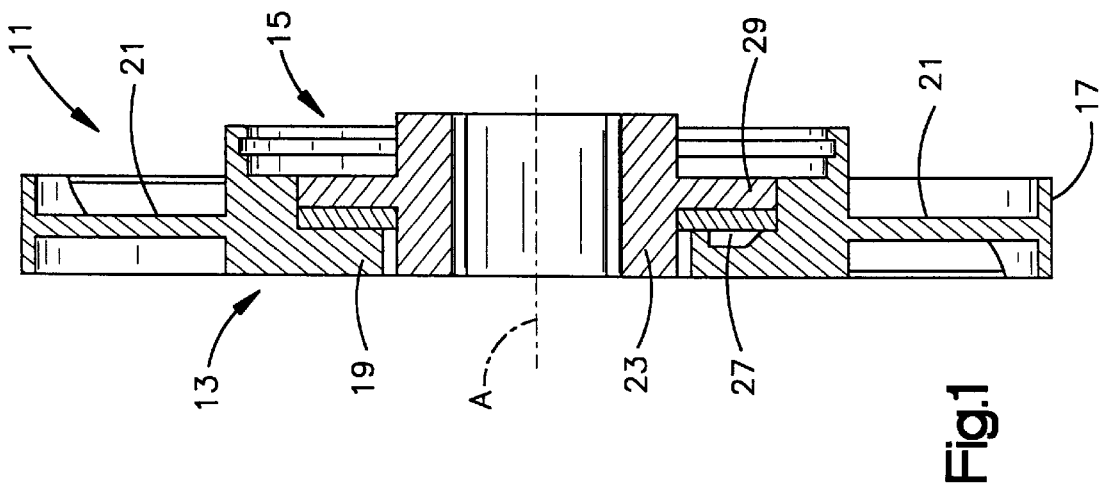
FIG. 1 is an axial cross section of a stator assembly, made in accordance with the present invention, for use in a torque converter of an automatic transmission.

Referring now to the drawings, which are not intended to limit the invention, FIG. 1 is an axial cross-section of a stator assembly for use in a torque converter of a vehicle automatic transmission, neither the torque converter nor the automatic transmission being illustrated herein. The torque converter may be of the general type illustrated and described in any one of the following U.S. Pat. 4,441,315; 5,125,487; and 5,505,590, all of which are incorporated herein by reference.

The stator assembly, generally designated 11, includes a stator, generally designated 13 and a one-way clutch, generally designated 15. The stator 13 includes an annular outer ring 17, an annular stator hub 19, and a plurality of stator blades or vanes 21 extending radially from the hub 19 to the ring 17. In the subject embodiment, the ring 17, the hub 19, and the blades 21 are all formed integrally, such as by injection molding an appropriate plastic material, such as a phenolic resin, or by die casting an appropriate aluminum or magnesium alloy, or other suitable material, well known to those skilled in the art, or by forming the entire stator 13 as a powdered metal part.

As is also generally well known to those skilled in the art, a one-way clutch (OWC) typically includes a drive member and a driven member such that, for one direction of rotation of the drive member, the OWC transmits torque to the driven member, which rotates at the same speed as the drive member. However, if the direction of rotation of the drive member is reversed, or if the driven member rotates faster than the drive member, in the normal drive direction, the driven member merely "overruns" the drive member and no torque is transmitted through the OWC.

In the case of an OWC being utilized as part of a stator assembly, the stator 13 could comprise the "drive" member, and an internally-splined sleeve 23, which is stationary, could comprise the "driven" member, although it will be understood that the designations "drive" and "driven" are somewhat meaningless in the case of a torque converter stator, and the use of the terms "drive" and "driven" hereinafter will not limit the invention. What is more important is that the stator 13 must be able to overrun the sleeve 23. As is well known to those in the torque converter art, at low engine speeds, the one-way clutch 15 is engaged, and the stator 13 does not rotate with respect to either the impeller or the turbine However, as engine speed increases, the OWC 15 disengages, and permits the stator 13 to free-wheel about, or overrun, the splined sleeve 23.

In accordance with one important aspect of the present invention, the OWC 15 is of the "planar" type, i.e., the drive and driven members engage on a plane which is perpendicular to the axis of rotation A of the stator assembly 11, thus making the overall stator assembly 11 quite compact. Furthermore, in accordance with another important aspect of the present invention, a portion of the OWC 15 is formed integrally with the stator 13. More specifically, a portion of the drive member of the OWC 15 is formed integrally with the stator hub 19, either by molding or casting, as noted previously, and as will be described in greater detail subsequently.

Figure 4:
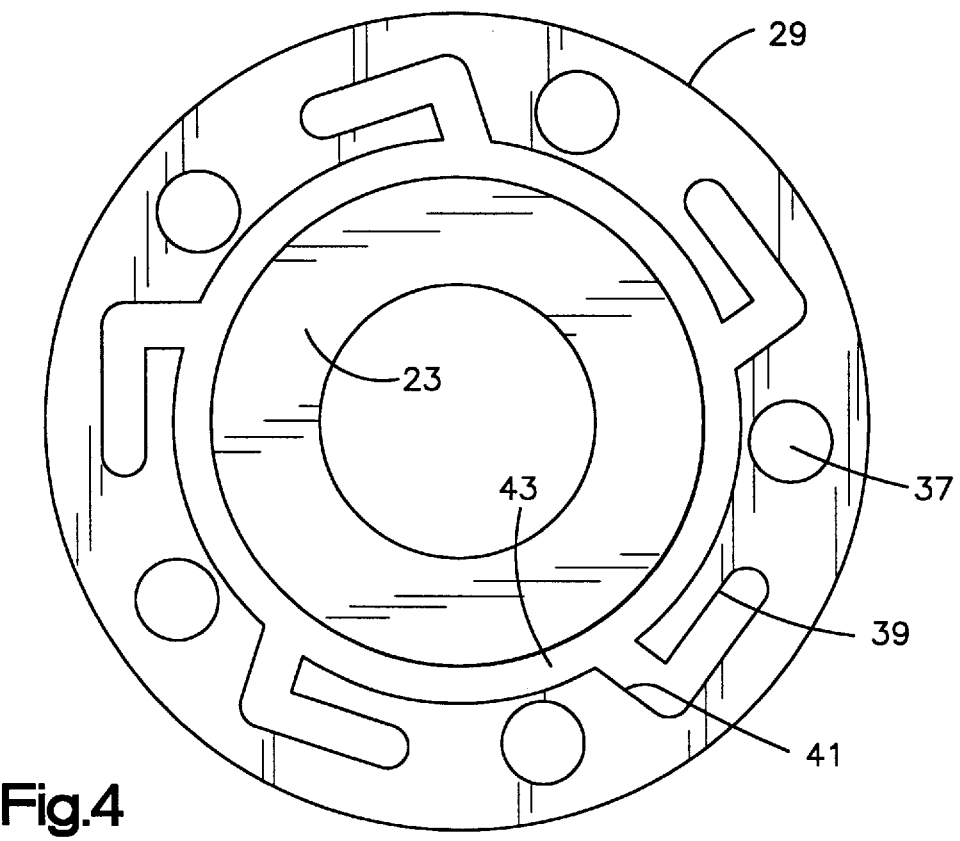
FIG. 4 is a plan view of the back-up plate, shown in perspective view in FIG. 3, and which comprises part of the drive assembly of the present invention.

Referring now primarily to FIG. 3, there is illustrated a driven assembly, generally designated 25, including a driven plate 27, having a driven face 28, and a backup plate 29. In accordance with one aspect of the present invention, the driven plate 27 comprises a relatively harder member, such as a hardened steel member, or a member stamped or fine-line blanked to the configuration shown, while the backup plate 29 comprises a relatively softer material, such as a powdered metal member. Alternatively, because the backup plate 29 is formed integrally with the splined sleeve 23, the entire part may comprise a plastic injection molded member. The driven plate 27 defines an alternating pattern of pin openings 31 and driven pockets 33, each driven pocket 33 including one surface 35 which is oriented generally radially, and which comprises a "driven surface". Referring now to FIG. 4, in conjunction with FIG. 3, the backup plate 29 defines an alternating pattern of pin openings 37 and spring recesses 39. Each spring opening 39 is oriented in a generally circumferential direction, and is connected by means of a radial recess 41 to an inner, annular recess 43. Disposed within the recesses 39, 41, and 43 is a spring assembly, generally designated 45. The element 45 is referred to as an "assembly", although preferably, it comprises a single member, such as an integral, stamped member. More specifically, the spring assembly 45 may be stamped from spring steel, for reasons which will become apparent subsequently.

Referring now also to FIG. 3A, the spring assembly 45 includes an annular support portion 47 which is received within the annular recess 43, and a spring member 49 is disposed in each of the spring recesses 39. Each spring member 49 is attached to the support portion 47 by means of a radial portion 51, which is disposed within the radial recess 41. Each spring member 49 includes an end 49a which is "fixed" or attached to the radial portion 51, and a free end 49b which, in its unrestrained state, pivots about end 49a and extends upwardly at an angle, as shown in FIG. 3A. It will be apparent to those skilled in the art that the thickness of each portion of the spring assembly 45 should be no greater than the depth of the respective recess in which it is received.

After the spring assembly 45 is placed into the recesses 39, 41, and 43, as shown in FIG. 3, the driven plate 27 is then placed over the backup plate 29, to trap the spring assembly 45 between the plates 27 and 29. Next, a pin or dowel 53 is pressed into each adjacent pair of pin openings 31 and 37, thus fixing the plates 27 and 29 to be non-rotatable relative to each other.

Figure 2:
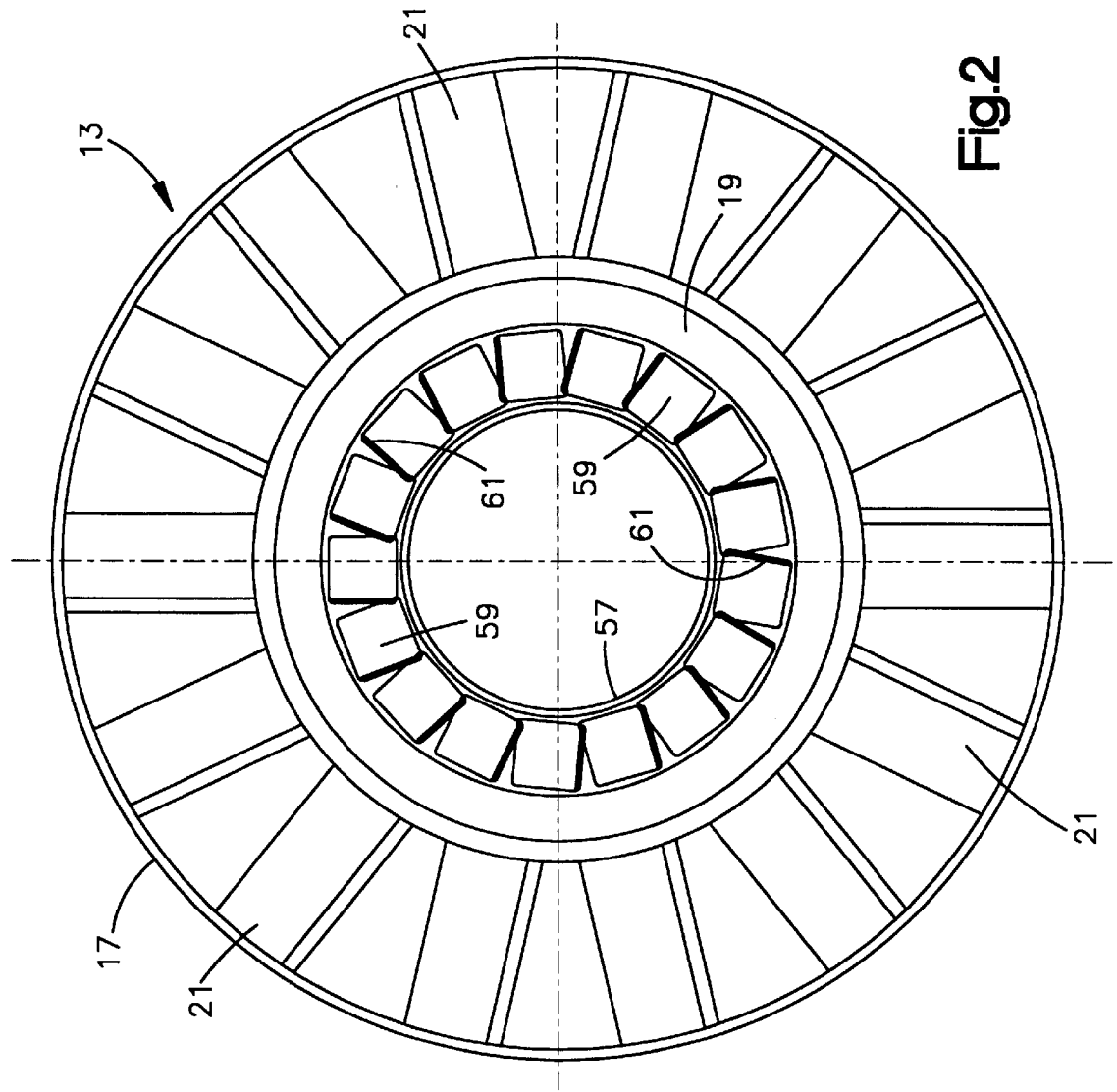
FIG. 2 is a plan view of the stator member of the present invention, viewed from the right in FIG. 1, and on the same scale as FIG. 1.

Within each of the driven pockets 33 there is placed a pawl or strut 55, only two of which are shown in FIG. 3, for ease of illustration, and wherein the pawls 55 are shown removed from their respective pockets. However, each pawl 55 would normally lie within the pocket 33, and in the plane of the driven plate 27, which constitutes the "retracted" position of the pawl 55. As is well known to those skilled in the OWC art, it is the pawl 55 which transmits torque to the driven assembly 25 from a drive member 57 which, as was noted previously is preferably formed integrally with the stator hub 19. In the subject embodiment, the drive member 57 is simply the "rearward" portion or right-hand portion (in FIG. 1) of the stator hub 19, or the radially innermost portion (in FIG. 2) of the stator hub 19. Typically, the drive member 57 includes a plurality of drive pockets 59, each of which includes a surface 61 which is oriented generally radially, and comprises the "drive surface".

Referring again primarily to FIG. 3, each of the pawls 55 includes a drive surface 63, adapted to engage the driven surface 35 and a driven surface 65, adapted to engage the drive surface 61 of one of the drive pockets 59. Both the driving and driven surfaces 63 and 65 are oriented generally radially, and are connected by a pair of side surfaces 67, such that the pawls 55 are generally rectangular in the embodiment of FIGS. 1 through 4.

Figure 5:
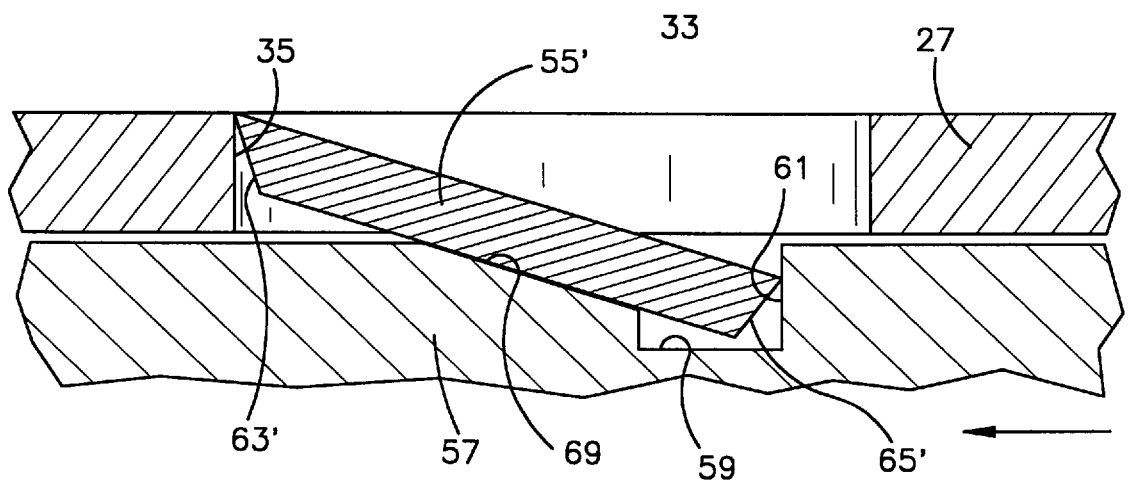
FIG. 5 an enlarged, fragmentary, axial cross section through one of the drive pawls of the present invention, illustrating one aspect of the present invention.

Referring now primarily to FIG. 5, in which the spring assembly 45 has been removed for ease of illustration, one aspect of the present invention will now be described. In the subject embodiment, there are five of the driven pockets 33, and the pawls 55, and seventeen of the drive pockets 59, such that there will typically be only one of the pawls 55 which is transmitting torque to the driven assembly 25 from the drive member 57, at any given moment. Thus, a substantial compressive load is applied through the pawl, lengthwise. As may be seen in FIG. 5, the drive pocket 59 defines a support surface 69 which is disposed immediately adjacent the surface of a modified pawl 55', in its "drive" position, and as shown in FIG. 5, the support surface 69 may actually be disposed in engagement with the adjacent surface of the pawl 55'. The pawl 55' includes driving and driven surfaces 63' and 65' which, rather than being disposed perpendicular to a longitudinal axis of the pawl 55, are angled somewhat, as shown. Thus, it may be seen in FIG. 5 that, when forces are transmitted to the driven plate 27, through the pawl 55', in the direction shown by the arrow, from the drive member 57, the angles on the surfaces 63' and 65' will result in a tendency for the pawl 55 to buckle or deform in a direction toward the support surface 69. However, the presence of the support surface 69 effectively prevents buckling in that direction, and in view of the fact that the angles won't allow buckling in a direction away from surface 69, buckling is substantially eliminated. Combinations of angles, other than those shown herein, may also prevent or substantially reduce the tendency of the strut to buckle.

It should be understood by those skilled in the art that the driven assembly 25 could constitute the drive or the input of the OWC 15, and that the drive member 57 could comprise the driven member or output. However, it is preferred, in the torque convertor stator application of the present invention, that the portion of the OWC 15 which includes the spring members and the pawls should be the "driven" member because, as noted previously, in a torque convertor stator, the driven member is actually stationary and does not rotate. Therefore, there is no centrifugal force exerted on either the spring members 49 or the pawls 55, such that the OWC 15 is more likely to be durable, and its performance more likely to be predictable and reliable.

Figure 6:
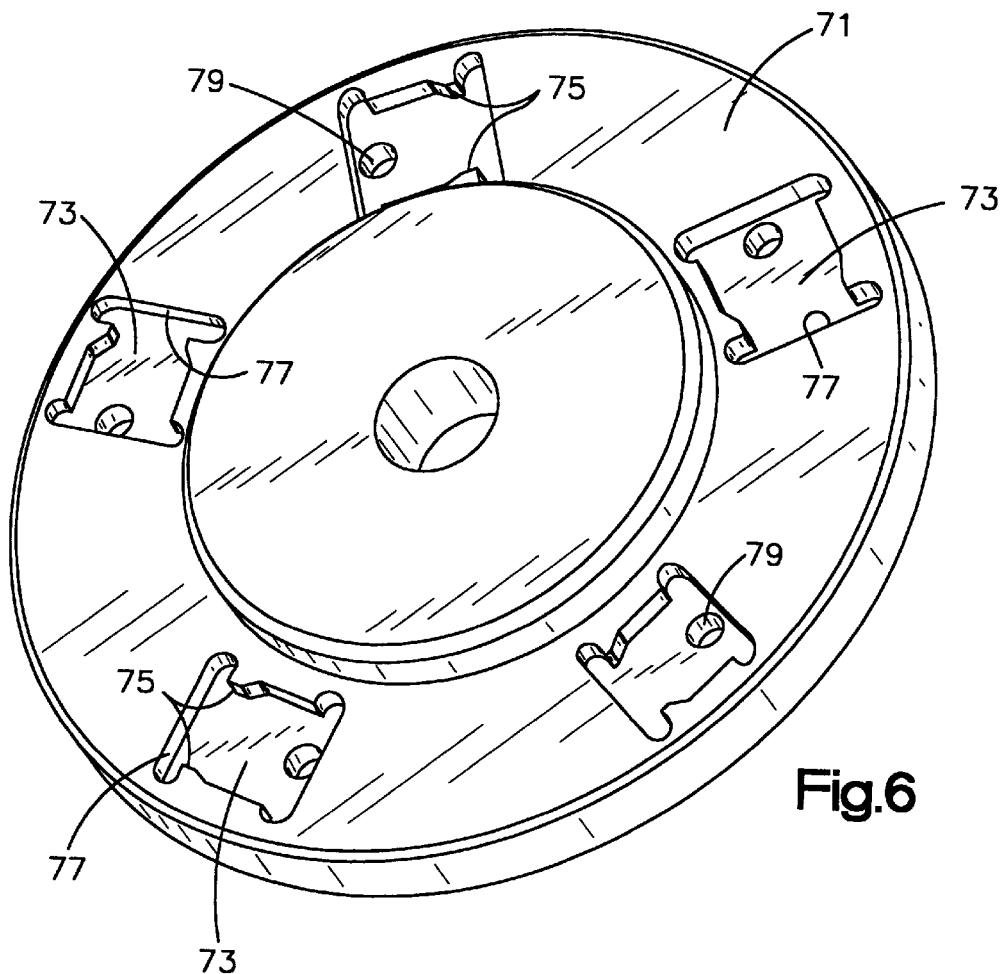
FIG. 6 is a perspective view of an alternative embodiment of the drive assembly of the present invention.
Figure 7:
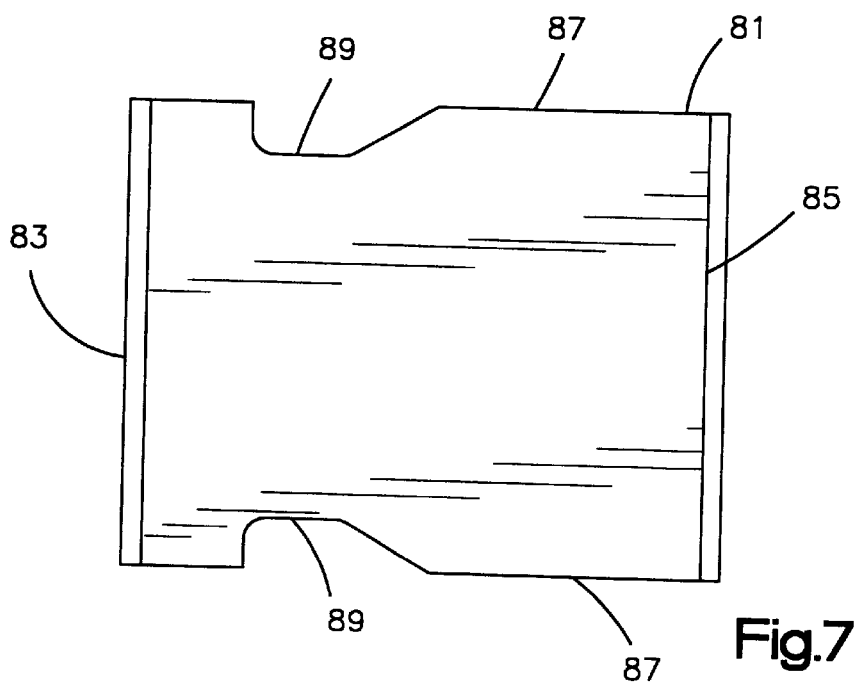
FIG. 7 is an enlarged plan view of an alternative embodiment of a pawl for use with the drive assembly of FIG. 6.

Referring now primarily to FIGS. 6 and 7, there is illustrated an alternative embodiment of the driven assembly of the present invention. In the embodiment of FIGS. 6 and 7, rather than the driven assembly comprising two separate parts, such as the driven plate 27 and the backup plate 29, there is a single driven plate 71. However, it will be understood by those skilled in the art that the features of this embodiment could be utilized in an embodiment in which there are separate driven and backup plates. The driven plate 71 defines a plurality of recesses or driven pockets 73, which are generally rectangular in overall configuration, as were the driven pockets 33 in the embodiment of FIGS. 1 through 3.

However, in accordance with one aspect of the present invention, the driven pockets 73 include a pair of oppositely disposed inward projections 75, the function of which will be described subsequently. Each driven pocket 73 includes a driven surface 77, and disposed toward the opposite end of the pocket 73 is a bore 79, within which may be disposed a coiled compression spring, to bias the pawl toward its drive position, as is well understood to those skilled in the art. The bores are included by way of example only, and various spring arrangements, other than a coiled compression spring, could be used.

In planar type one-way clutches, there is typically lubricant present in the region of the drive and driven members. It has been found that one result of the presence of lubricant is a tendency, when the OWC is operating in the overrunning mode, for the overrunning member to "drag" the pawl out of its pocket in the driven member. Alternatively, if the pawl, in its retracted position, is disposed within a pocket in the drive member, then when the drive member overruns the driven member, there will be a tendency for the driven member to drag the pawl out of its pocket in the drive member.

Referring now primarily to FIG. 7, there is illustrated a pawl 81 including a driving surface 83, disposed to be in engagement with the driven surface 77 of the driven member 71. The pawl 81 also includes a driven surface 85, which is disposed to be in engagement with the driving surface of the drive member. Extending between the surfaces 83 and 85 is a pair of side surfaces 87, each of which defines an indentation 89. The indentations 89 are located and sized to receive the projections 75, and thereby retain the pawl 81 within the drive pocket 73. Therefore, if the drive member (not shown) is overrunning the driven member 71 (i.e., rotating counterclockwise in FIG. 6, relative to the driven member 71), the tendency for the drive member to drag the pawls 81 out of their pockets 73 will be overcome by the engagement of the projections 75 within the indentations 89. One benefit of the embodiment of FIGS. 6 and 7 is that the pawls 81 are flat, thus facilitating a number of relatively simple and inexpensive methods of manufacture of the pawls 81. The use of the projections 75 and indentations 89 also means that assembly of the pawls 81 within the pockets 73 can be done in only the correct way.

Those skilled in the art will understand that the various embodiments disclosed may be combined, even though not illustrated together herein. For example, the driven assembly 25 of FIG. 3 may utilize a driven plate 27 in which the driven pockets 33 include the projections 75 of FIG. 6, and the pawls 55 include the indentations 89 of FIG. 7. The features of FIG. 5 could also be included in the combination of embodiments described above. Finally, although the preferred embodiment for the OWC of the invention is in connection with a torque converter stator, the invention is not so limited, and the various features disclosed may be used, in various combinations, in a OWC which is to be utilized in any of the other well known applications for one way clutches.

The invention has been described in great detail in the foregoing specification, and it is believed that various alterations and modifications of the invention will become apparent to those skilled in the art from a reading and understanding of the specification.

It is intended that all such alterations and modifications are included in the invention, insofar as they come within the scope of the appended claims.

We claim:

1. A one-way clutch assembly of the type including a planar driven member mounted for rotation about an axis, said planar driven member including a planar driven face disposed normal to said axis; a planar drive member mounted for rotation about said axis; and having a drive direction of rotation, said planar drive member defining a plurality of drive pockets, each including a drive surface; said driven face defining a plurality of driven pockets, each including a driven surface; a plurality N of pawls disposed in one of said drive and driven pockets, each of said pawls comprising a separate member, and having a retracted position in which each pawl is disposed wholly within said one of said drive and driven pockets, and a drive position in which each pawl engages both said drive surface and said driven surface, as said drive and driven members transmit torque in said drive direction of rotation; means operable to bias each of said pawls toward said drive position; characterized by:

(a) said means operable to bias each of said pawls comprising a plurality N of spring members each being disposed axially adjacent one of said pawls;

(b) an annular support member disposed in an annular recess defined by one of said drive and driven members; and (c) each of said plurality N of spring members being formed integrally with said annular support member.

2. A one-way clutch assembly as claimed in claim 1, characterized by each of said plurality N of spring members comprising an elongated, generally flat member, oriented generally circumferentially, each having a fixed end and a free end.

3. A one-way clutch assembly as claimed in claim 2, characterized by said annular support member being disposed radially inward from said spring members, and attached thereto by a plurality N of radially extending portions, each being formed integrally with said annular support member and with said fixed end of one of said spring members.

4. A one-way clutch assembly as claimed in claim 1, characterized by said driven member defining a plurality N of driven pockets, each of said plurality N of pawls being disposed wholly within one of said driven pockets in said retracted position.

5. A one-way clutch assembly as claimed in claim 4, characterized by said drive member defining a plurality M of drive pockets, wherein neither M nor N is a whole number multiple of the other.

6. A one-way clutch assembly as claimed in claim 4, characterized by said driven member comprises a driven plate defining said plurality N of driven pockets, and a back-up plate disposed immediately adjacent said driven plate, and fixed for rotation therewith, said driven plate and said back-up plate cooperating to define a plurality N of spring chambers, each being disposed axially adjacent one of said driven pockets, each of said spring members being disposed in one of said spring chambers when its respective pawl is in said retracted position.

7. A one-way clutch assembly as claimed in claim 6, characterized by said back-up plate defines an annular chamber receiving said annular support member, and further defines each of said plurality N of spring chambers, and a plurality N of radially extending chambers receiving a plurality N of radially extending portions, connecting said annular support member and said plurality N of spring members.

8. A one-way clutch assembly as claimed in claim 6, characterized by said driven plate comprising a relatively hard member, and said back-up plate comprising a relatively soft member.

9. A one-way clutch assembly as claimed in claim 4, characterized by said drive pocket defines a support surface, disposed adjacent said drive surface, said support surface being operable to support a pawl which is in said drive position engaging said driven surface.

10. A one-way clutch assembly as claimed in claim 9, characterized by each of said pawls including a driving surface in engagement with said driven surface of said driven pocket, and a driven surface in engagement with said drive surface of said drive pocket, when said pawl is in said drive position, said driving and driven surfaces of said pawl being configured, relative to said driven and drive surfaces, respectively, of said driven and drive pockets, respectively, such that a compressive load on said pawl will tend to buckle said pawl into engagement with said support surface.

11. A one-way clutch assembly as claimed in claim 1, characterized by each of said driven pockets being generally rectangular, and each of said pawls being generally rectangular and flat and including generally radially oriented driven and driving surfaces, and a pair of side surfaces, extending between said driven and driving surfaces, said side surfaces defining retention portions and said driven pockets defining projections configured to extend into said retention portions and retain said pawl within said driven pocket when said drive member overruns said driven member.

12. A one-way clutch assembly as claimed in claim 1, characterized by said one-way clutch assembly comprising part of a stator assembly adapted for use in a torque converter, said stator assembly being of the type comprising a stator hub and a plurality of stator blades, at least a part of said drive member being fixed to rotate with said stator hub.

13. A one-way clutch assembly as claimed in claim 12, characterized by said drive member defines said plurality of drive pockets, said drive member being formed integrally with said stator hub and said plurality of stator blades.

14. A one-way clutch assembly as claimed in claim 13, characterized by said stator hub, said plurality of stator blades, and said drive member comprising a one-piece plastic molding.

\* \* \* \* \*